United States Patent [19]

Ito

[11] Patent Number: 5,088,050
[45] Date of Patent: Feb. 11, 1992

[54] APPARATUS FOR PREPARING OUTPUT DATA FROM INPUT IMAGE DATA, USING BASIC OUTPUT-IMAGE UNIT PATTERN DATA

[75] Inventor: Yosuke Ito, Nagoya, Japan

[73] Assignee: Brother Kogyo Kabushiki Kaisha, Aichi, Japan

[21] Appl. No.: 550,983

[22] Filed: Jul. 11, 1990

[30] Foreign Application Priority Data

Jul. 14, 1989 [JP] Japan ................................. 1-183514

[51] Int. Cl.$^5$ ........................ G06F 3/00; G06F 15/66
[52] U.S. Cl. .................... 395/142; 340/747; 382/41; 395/117
[58] Field of Search ............... 364/518, 519, 521, 522; 340/747, 750; 382/41, 46, 47

[56] References Cited

U.S. PATENT DOCUMENTS

| | | | |
|---|---|---|---|
| 4,631,750 | 12/1986 | Gabriel et al. | 382/41 |
| 4,833,962 | 5/1989 | Mazzola et al. | 84/1.01 |
| 4,908,874 | 3/1990 | Gabriel | 382/41 |
| 4,941,193 | 7/1990 | Barnsley et al. | 382/56 |
| 4,945,495 | 7/1990 | Ueda | 364/518 |

Primary Examiner—Gary V. Harkcom
Assistant Examiner—Phu R. Nguyen
Attorney, Agent, or Firm—Oliff & Berridge

[57] ABSTRACT

An apparatus for preparing output data representative of an output image consisting of output image segments each defined by output picture elements such that each output image segments corresponds to each input picture element. The apparatus includes a pattern data memory for storing at least one set of basic output-image unit pattern data each representative of a basic pattern of position of output picture elements defining a basic output image area, and a device for preparing the output data for each output image segment whose pattern of positions of output picture elements is identical with the basic pattern represented by any set of basic output-image unit pattern data stored in the memory. The output data are prepared based on the appropriate set of unit pattern data, without determining the positions of the output picture elements lying within the outline of that output image segment obtained from the corresponding input picture element.

17 Claims, 12 Drawing Sheets

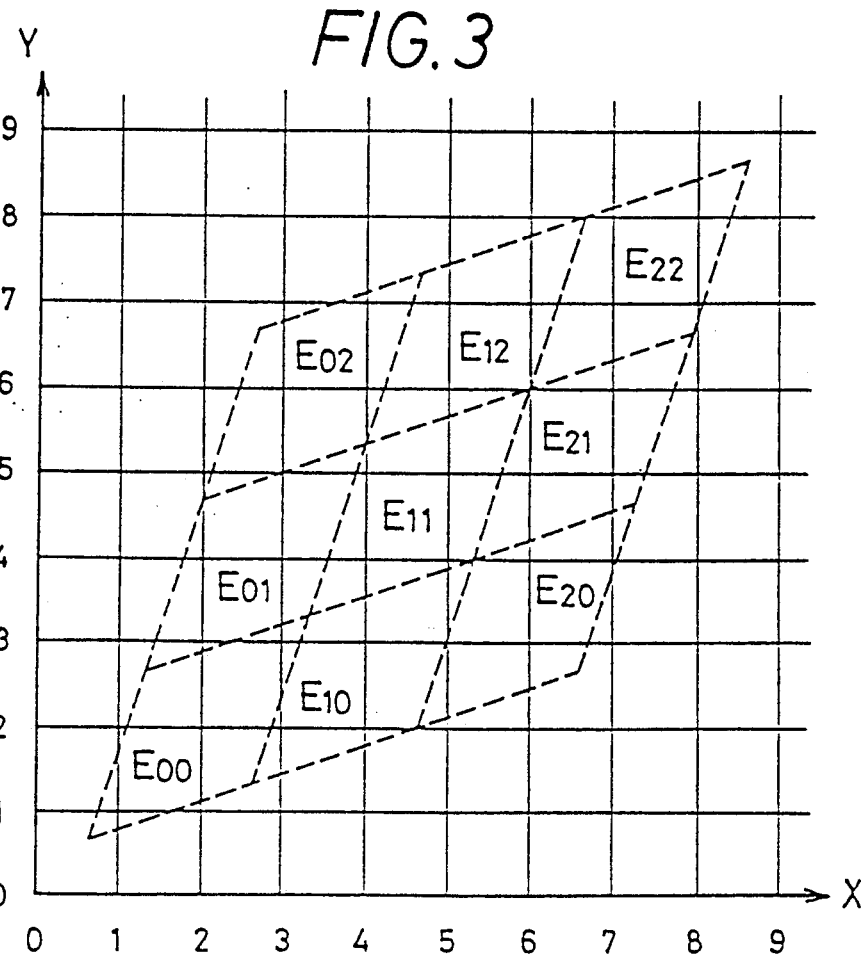
FIG. 3
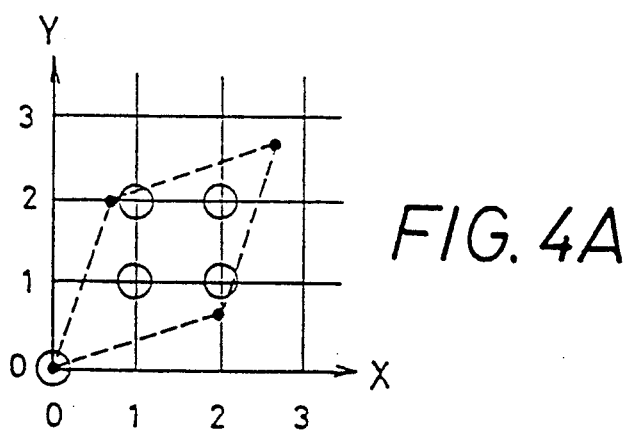
FIG. 4A
| RASTER NO. | START POINT | END POINT |
|---|---|---|
| 2 | 1 | 2 |
| 1 | 1 | 2 |
| 0 | 0 | 0 |
FIG. 4B

FIG.7B-1
| RASTER NO. | START POINT | END POINT |
|---|---|---|
| 2 | 1 | 2 |
| 1 | 1 | 2 |
| 0 | 0 | 0 |
FIG.7B-2
| RASTER NO. | START POINT | END POINT |
|---|---|---|
| 2 | 2 | 3 |
| 1 | 1 | 2 |
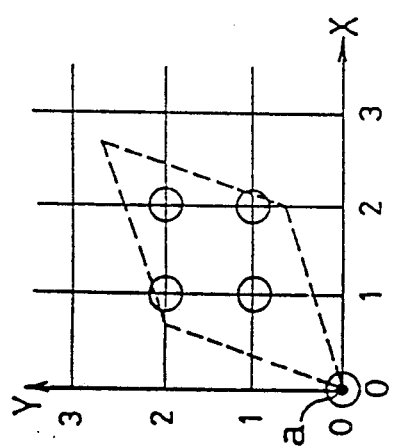
FIG.7A-1
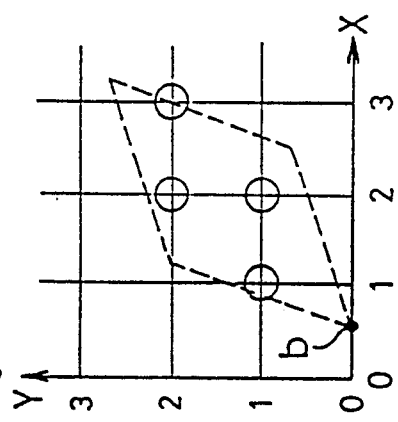
FIG.7A-2

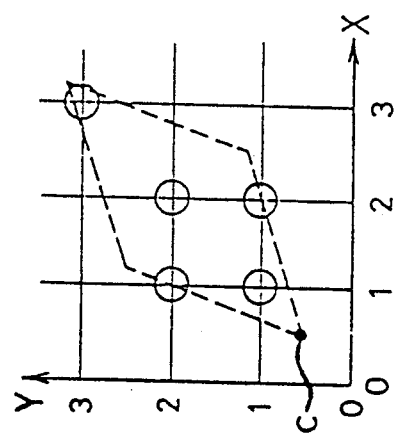
FIG.7A-3
FIG.7B-3
| RASTER NO. | START POINT | END POINT |
|---|---|---|
| 3 | 3 | 3 |
| 2 | 1 | 2 |
| 1 | 1 | 2 |
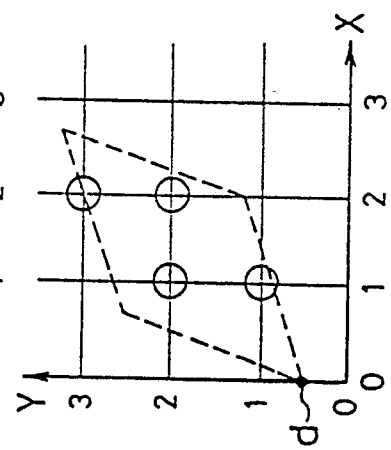
FIG.7A-4
FIG.7B-4
| RASTER NO. | START POINT | END POINT |
|---|---|---|
| 3 | 2 | 2 |
| 2 | 1 | 2 |
| 1 | 1 | 1 |

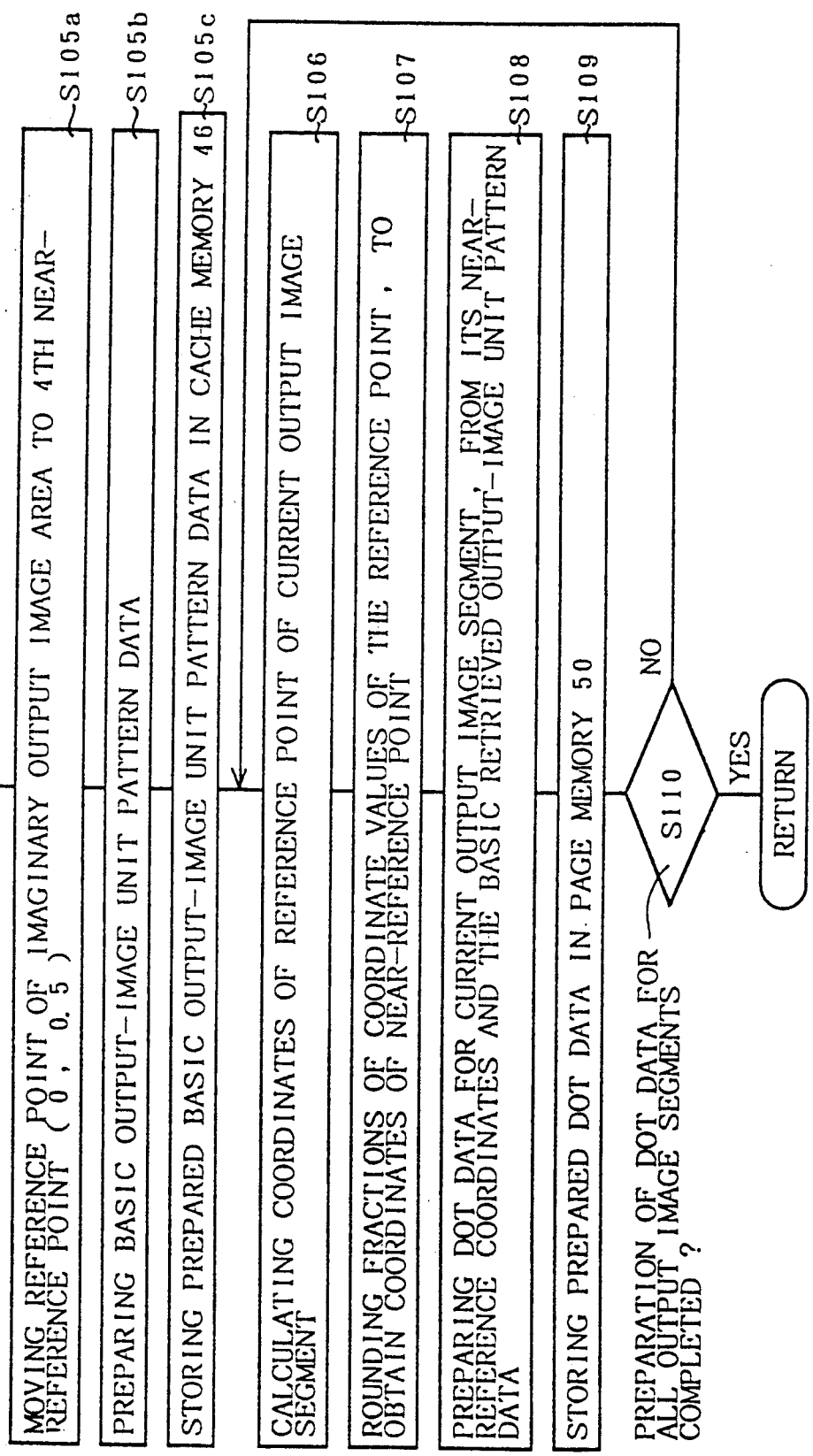

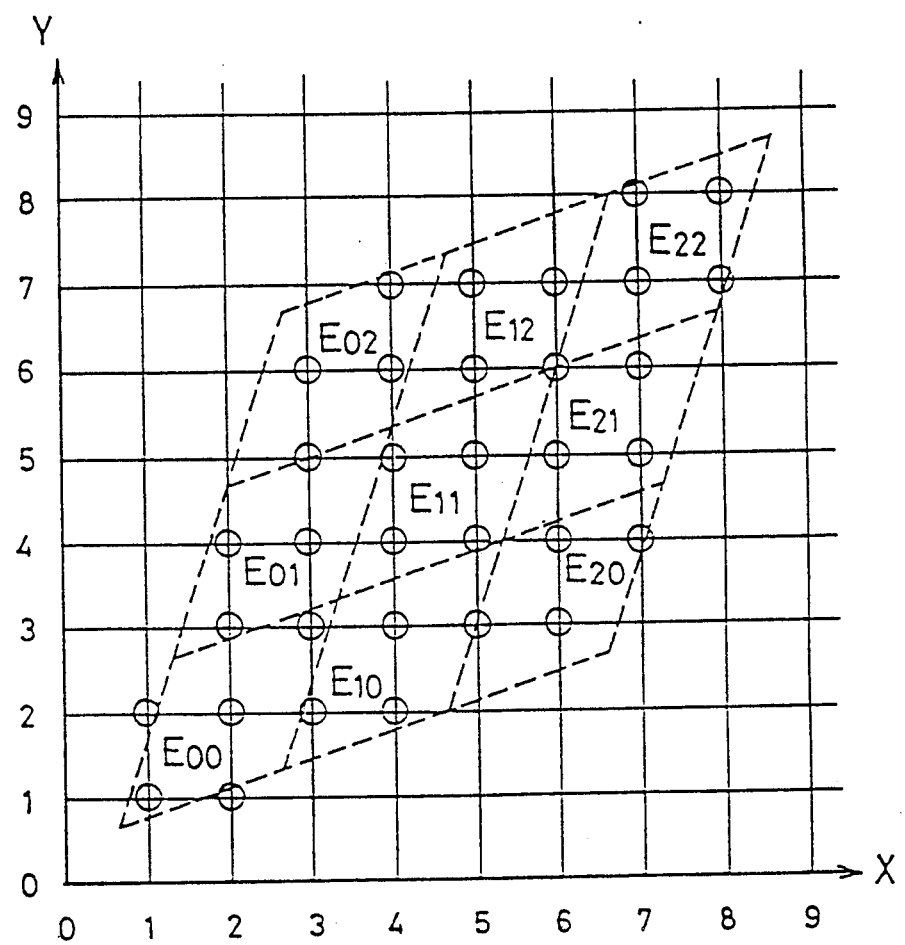

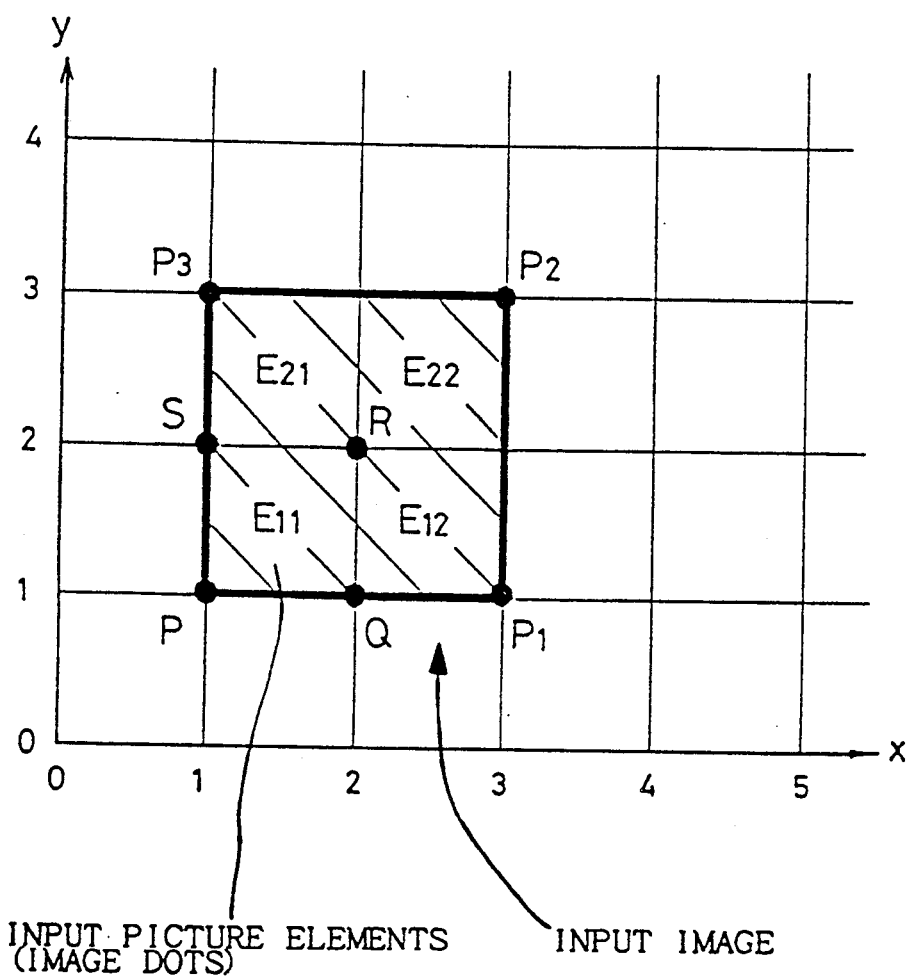

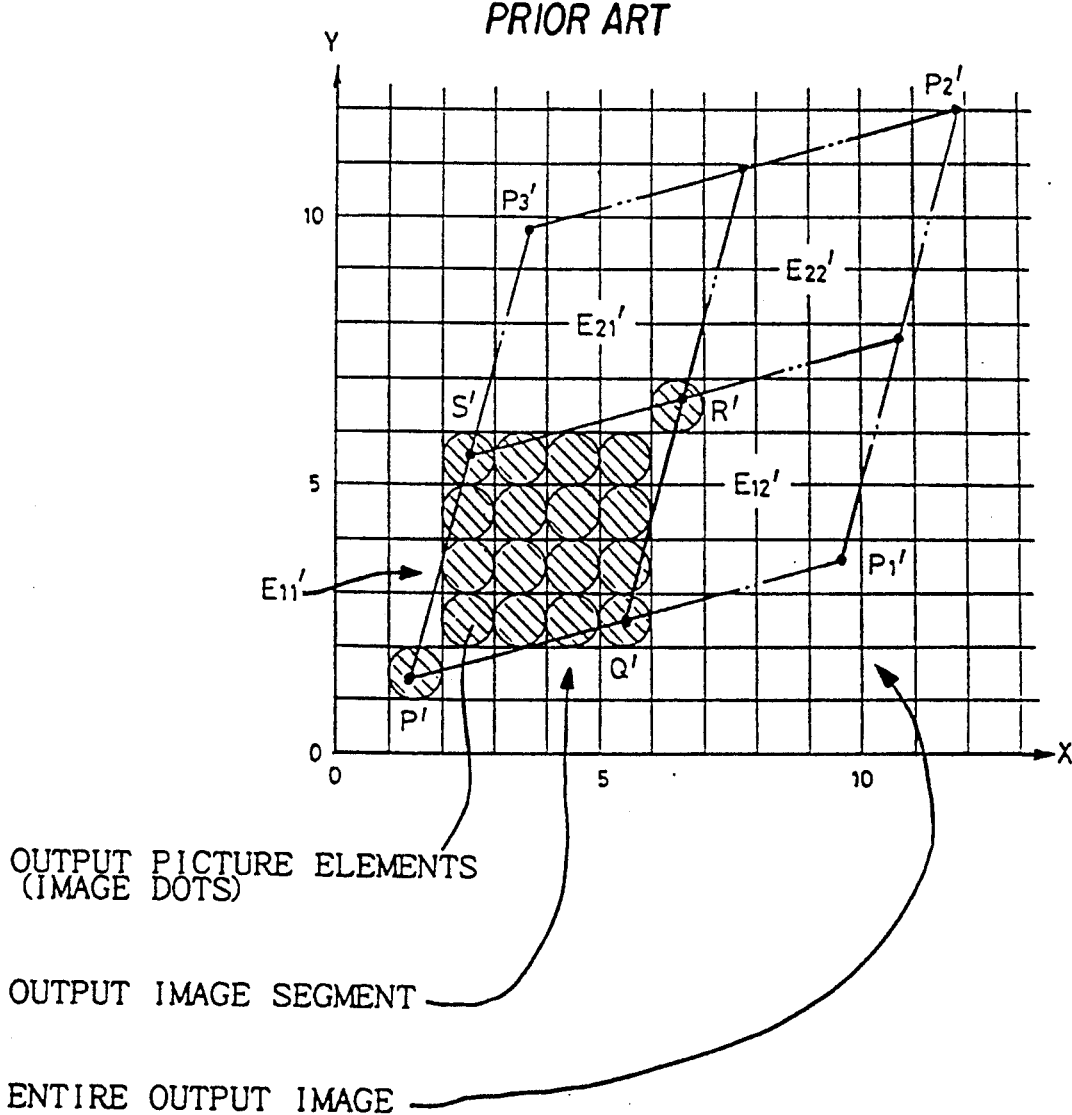

APPARATUS FOR PREPARING OUTPUT DATA FROM INPUT IMAGE DATA, USING BASIC OUTPUT-IMAGE UNIT PATTERN DATA

BACKGROUND OF THE INVENTION

Field of the Invention

The present invention relates generally to an apparatus for preparing output data for reproducing images on a suitable output or reproduction medium according to an input image data representative of picture elements corresponding to image dots. More particularly, the present invention is concerned with a technique for reducing the required time for preparing such output data from the received input image data.

Discussion of the Prior Art

An output data preparing apparatus as indicated above is generally provided between a data input device and an image output device. A desired image consisting of a plurality or multiplicity of picture elements as superposed on an input coordinate system is entered through the data input device, while an output image corresponding to the input image is reproduced on a suitable output medium such as a recording medium or a display screen. The output image also consists of a multiplicity of output picture elements or image dots as superposed on an output coordinate system. The data input device includes an image input portion such as an image scanner or data entry keyboard, and an image processing portion such as a host computer. For example, the host computer is adapted to define the positions of the input picture elements in the input coordinate system. The image output device may be a laser printer or a CRT display, for example, which includes an image reproducing portion for forming the image dots at the selected picture elements (hereinafter referred to as "output picture elements" where appropriate) on the output medium, and a control portion for controlling the image reproducing portion. Usually, the control portion functions as an apparatus for preparing output data such as printing data in the form of dot data representative of the image dots or output picture elements.

The input coordinate system may be a rectangular coordinate system having mutually perpendicular x and y axes, as shown in FIG. 11A, and picture elements are defined by pixel lines parallel to these x and Y axes. By entering image data through the data input device, the appropriate picture elements as defined in the input coordinate system are selected as the input picture elements at which image dots are to be formed to define an input image. On the other hand, the output coordinate system may be a rectangular coordinate system having mutually perpendicular X and Y axes, as shown in FIG. 11B. As in the input coordinate system, picture elements are defined by pixel lines parallel to the X and Y axes. Image dots are printed at the positions of the specified picture elements as defined in the output coordinate system. These picture elements will be referred to as "output picture elements" where appropriate.

The input coordinate system used by a host computer or other data input device is not always identical with the output coordinate system used by a laser printer, CRT display or other image output device. Although the input and output coordinate systems are both rectangular coordinate systems, these systems often differ in the size of the picture elements, i.e., the image dot size. In the example of FIGS. 11A and 11B, the number of picture elements per unit area of the output coordinate system is larger than that of the input coordinate system. In other words, one input picture element does not necessarily correspond to one output picture element, and often corresponds to a plurality of output picture elements (image dots to be formed). In this case, the number and positions of the output picture elements should be determined for each of the input picture elements of the input image received from the data input device.

In view of the above, a known output data preparing device usually includes outline data preparing means and output data preparing means. The outline data preparing means is adapted to prepare outline data representative of the outline of each output image segment corresponding to each input picture element. The output data preparing means is adapted to prepare output data in the form of dot data representative of the positions of the output picture elements which lie within the outline defined by the prepared outline data, so as to meet a predetermined rule. For instance, the predetermined rule requires that the entire area of each output picture element be located within the outline, or at least a portion of the area of the output picture element be within the outline. An alternative rule requires that the center of each output picture element be located within the outline.

A conventional manner of preparing output dot data from an input image data will be described by reference to FIGS. 11A and 11B. In the example of these figures, the input image is a square defined by four coordinate points P, P1, P2 and P3 in the input coordinate system, namely, a square image consisting of four input picture elements E11, E12, E21 and E22 which are adjacent to each other, as shown in FIG. 11A. On the other hand, the output image (entire output image) corresponding to the input image is obtained by so-called "affine transformation of the coordinates of the input image in the input coordinate system into corresponding coordinates in the output coordinate system according to a predetermined rule, that is, by expanding and transforming the square outline of the input image along a diagonal line which extends from the origin (0, 0) of the input coordinate system, so that the obtained output image is a rhombic image whose four sides are defined by coordinate points P', P1', P2' and P3' in the output coordinate system, as indicated in FIG. 11B. This rhombic output image consists of four segments (output image segments) E11', E12', E21' and E22' which are adjacent to each other.

Taking the output image segment E11', for example, the x and y coordinate values of four points P, Q, R and S defining the corresponding input picture element E11 are converted by the affine transformation into the X and Y coordinate values of four points P', Q', R' and S' defining the output image segment E11'. In this example, the X and Y coordinate values of the four points or apexes P', Q', R' and S' constitute the outline data of the output image segment E11'. Thus, the outline data is prepared for each of the output image segments E11', E12', E21' and E11', and the output picture elements which lie within the outline defined by the outline data are selected for each output image segment. The dot data representative of these selected output picture elements are prepared for each output image segment.

Where the input image is comparatively simple in shape as in the example of FIG. 11A, the X and Y coordinates of the four points P', P1', P2' and P3' defining the entire output image corresponding to the input image may be calculated by the affine transformation of the x and y coordinates of the points P, P1, P2 and P3 of the input image. In this case, the output picture elements which lie within the outline defined by the points P', P1', P2' and P3' are selected so that the output dot data for the entire output image consisting of the selected output picture elements are prepared at one time, without sequentially preparing the sets of dot data for the individual segments E11', E12', E21' and E22'.

However, the input images are not always or necessarily simple in configuration, but are relatively complicated in most cases. Accordingly, the preparation of the dot data corresponding to a complicated input image requires the sequential preparation of sets of dot data for individual segments of the corresponding output image.

SUMMARY OF THE INVENTION

Usually, a laser printer and a CRT display are required to reproduce images at a high speed. To this end, the image output devices require an output data preparing apparatus which prepares output data at a high speed sufficient for high speed reproduction of the images according to the output data. Accordingly, the output data preparing apparatus should be capable of determining the number and positions of the output picture elements as soon as the corresponding input image data are received, so that the output data representative of the output picture elements can be supplied to the image output device in a short time after the reception of the input image data. However, the conventional apparatus is not satisfactory in this respect, since it is adapted to effect sequential preparation of multiple sets of output data for the individual output image segments corresponding to the respective input picture elements defined by the input image data.

It is therefore an object of the present invention to provide an apparatus capable of preparing output data from received input image data, at a sufficiently high speed even where an input image represented by the input image data is considerably complicated in configuration.

The above object may be attained according to the principle of the present invention, which provides an apparatus for preparing output data representative of positions of a plurality of output picture elements which collectively define a plurality of output image segments corresponding to respective input picture elements of a received input image, the output image segments being reproduced on an output medium according to the output data, the apparatus comprising: (a) first data preparing means for determining a basic output image area for each of at least one group of output image segments, and preparing at least one set of basic output-image unit pattern data corresponding to the at least one group of output image segments, respectively, each set of basic output-image unit pattern data being representative of a pattern of positions of output picture elements of the basic output image area, each group of output image segments consisting of the output image segments which have a same pattern of positions of the output picture elements as the pattern represented by the corresponding set of basic output-image unit pattern data; (b) pattern data memory means for storing the at least one set of basic output-image unit pattern data such that the pattern of positions represented by one of the at least one set of basic output-image unit pattern data is distinguishable from that represented by another of the at least one set of basic output-image unit pattern data; and (c) second data preparing means operable such that if the pattern of any one of the output image segments corresponding to the input picture elements is identical with the pattern of said basic output image area represented by any one of the at least one set of basic output-image unit pattern data stored in the pattern data memory means, second data preparing means prepares a set of output data representative of positions of the output picture elements of any one output image segment, according to the corresponding set of basic output-image unit pattern data, without determining positions of the individual output picture elements of that one output image segment.

In the apparatus of the present invention constructed as described above, the basic output-image unit pattern data representative of the basic output image area for each group of output image segments of the output image are stored in the pattern data memory means. The output data for each output image segment belonging to the group having the same pattern of positions of output picture elements are prepared by changing the stored basic output-image pattern data, without the conventionally required determination of the positions of the individual output picture elements. More specifically, the present apparatus does not require the preparation of the outline data of each output image segment and the determination of the output picture elements which lie within the outline, as practiced in the conventional apparatus. Accordingly, the present apparatus is capable of reducing the time required for preparing the output data from the input image data.

It is noted that the positions and the number of the output picture elements or image dots defining an output image segment are determined by the position of the output image segment in the output coordinate system. The position of the output image segment in the output coordinate system is determined depending upon the position of the corresponding input picture element in the input coordinate system. There exist a number of positions of the output image segment relative to the output coordinate system. However, the pattern of the output picture elements of a given output image segment is the same as that of another output image segment whose reference point is spaced from that of the above-indicated given output image segment, by a distance or distances equal to a multiple of the size of the picture elements in the X direction and/or Y direction. In the present apparatus, this pattern of the output picture elements is represented by a set of basic output-image unit pattern data stored in the pattern data memory means. Namely, the basic output-image unit pattern data represent the basic pattern of positions of output picture elements, which is common to the individual segments of the output image which belong to the same group having the same pattern. That is, the basic output-image unit pattern data represent the pattern of the basic output image area determined for each group of the output image segments which have a same pattern of output picture elements. Therefore, the output data for each group of the segments of the output image may be easily prepared by simply translating the coordinates of the corresponding set of basic output-image unit pattern data, in the output coordinate system, depending upon the coordinates of the individual output image segments, if the output image segments are spaced in the X and Y directions by distances equal to a multiple of the size of the picture elements. To this end, the output image segments corresponding to the respective picture elements are moved or translated in the output coordinate system by suitable distances such that the translated output picture elements are spaced from each other by distances equal to multiples of the size of the picture elements. Thus, the output image segments are classified into at least one group each of which has the same pattern of positions of output picture elements.

The above classification may be achieved by moving each output image segments from a first reference point which is determined by the position of the corresponding picture element, to a second reference point which is distant from the first reference point in the X and Y directions by distances suitable for enabling a group of output image segments to have a same pattern of positions of output picture elements. Preferably, the distances are smaller than the size of the picture elements.

However, the second reference points of the individual segments of the output image may be located at any point in the output coordinate system. For example, the second reference points may be placed at the nominal position of the picture elements nearest to the first reference points. However, the second reference points need not be placed at the nominal positions of the picture elements, and the distances of the second reference points from the first reference points in the X and Y directions may be selected as desired, though the distances in the X and Y directions are preferably smaller than the size of the picture elements. In other words, the relative position between the first and second reference points of a given output image segment may be selected as desired, depending upon the position of that particular output image segment in the output coordinate system before the first reference point is moved to the second reference point. If the the second reference point relative to the first reference point is common for all the output image segments, only one basic pattern of output picture elements represented by only one set of basic output-image unit pattern data is used to prepare the output data for the entire output image. For improving the accuracy of conversion of the input image into the output image, it is desirable to divide the output image segments into two or more groups which have different patterns of positions of output picture elements. In this case, the second reference point is different depending upon the first reference point of each output image segment in the output coordinate system. To assure sufficient reduction in the required time for preparing the output data, however, the number of groups of the output image segments is preferably limited, since the increase in this number results in increasing the number of sets of basic output-image unit pattern data and accordingly increasing the time required for preparing the basic output-image unit pattern data. Namely, the number of the basic patterns of output picture elements of the output image segments is desirably limited to assure efficient preparation of the output data for the entire output image. Thus, the present arrangement requires the preparation of one set or a relatively limited number of sets of basic output-image unit pattern data. While the preparation of each set of basic output-image unit pattern data requires preparation of outline data representative of output picture elements of the basic output image area, the preparation of the output data for the output image segments whose pattern is defined by any set of basic output-image unit pattern data does not require the preparation of the outline data to determine the positions and number of the output picture elements which define the segments.

In one form of the present invention, the first data preparing means comprises: means for determining coordinates of a first reference point of one of translated output image areas corresponding to respective translated input image areas which are obtained by translating any one of the input picture elements; means for rounding the determined coordinates of the first reference point of the one translated output image area, and thereby determining coordinates of a second reference point of the one translated output image area; and outline data preparing means for preparing outline data representative of an outline of the one translated output image area. In this case, the first data preparing means is adapted to prepare each of the at least one set of basic output-image unit pattern data of the basic output image area such that the each set of basic output-image unit pattern data represent positions of output picture elements lying within the outline of the relevant translated output image area which has been translated on the output medium so that the first reference point of the relevant translated output image area is aligned with a predetermined point which satisfies a predetermined condition. The second data preparing means is operable such that if the pattern of any one of the output image segments is identical with the pattern of the basic output image area represented by any one of the at least one set of basic output-image unit pattern data stored in the pattern data memory mans, the second data preparing means determines a second reference point of that one output image segment similar to the second reference point of the relevant translated output image area, and prepares the set of output data representative of the relevant output image segment, by changing the corresponding set of basic output-image unit pattern data such that the second reference points of the output image segment and the basic output image area are aligned with each other.

The above-indicated one translated output image area used to prepare the outline data for preparing the basic output-image unit pattern data may correspond to one of the translated input image areas which consists of one of the input picture elements, or which is obtained by translating any one of the input picture elements to a position outside the input image.

The first reference point may be located as needed. Where the above-indicated one translated output image area used for preparing the outline data is a rectangular area, as indicated at E11' in FIG. 11B, one of four apexes of the rectangle, for example, the left lower apex of the rectangle, may be used as the first reference point. However, the first reference point may be located at any point within or outside the profile of the translated output image area.

The predetermined point with which the first reference point is aligned when the basic output-image unit pattern data are prepared from the outline data may be the second reference point, or a point which is substantially a center of an area in which the second reference point obtained by rounding the coordinates of the first reference point may be located.

The above-indicated one translated output image area may consist of one of the output image segments corresponding to one of the input picture elements, or may be a translated output image area which is obtained by translating one of the output image segments corresponding to any input picture element, to a position outside the output image segments.

The second reference point may be a near-reference point which is relatively near the first reference point and whose X and Y coordinates values are not larger than those of the first reference point. The near-reference point may be obtained by discarding the decimal fractions of the X and Y coordinate values of the reference points of the segments, where the size of the picture elements in the output coordinate system is represented by the X and Y coordinate values of "1" or other integers, as in the case of FIGS. 11A and 11B. The near-reference points may also be determined by discarding the decimal fractions of the X and Y coordinate values of the reference points if the decimal fractions are smaller than "0.5", and by rounding the decimal fractions to "0.5" if the fractions are equal to "0.5" or larger. In the former case, the outlines of the translated output-image areas whose first reference points are moved to the determined near-reference points (second reference points) are aligned with each other by translating the outlines in the output coordinate system. Hence, the output data for each output image segment can be prepared by changing the coordinates of the basic output-image unit pattern data according to the coordinates of the near-reference points of the individual output image segments. In this case, only one set of basic output-image unit pattern data is stored in the pattern data memory means. In the latter case, there are four different relative positions between the near-reference points and the first reference points, as indicated in FIGS. 7A. These four different relative positions correspond to respective four different groups of output image segments, and there are provided four sets of basic output-image unit pattern data. However, all of the four sets of unit pattern data are not necessarily actually used for a given output image which may or may not include all of the four groups of segments.

The first data preparing means may be adapted to prepare all of the at least one set of basic output-image unit pattern data and the pattern data memory stores the prepared all sets of data, in relation to the coordinates of the second reference point of the basic output image area, before the second data preparing means operates to prepare the output data for the output image segments. Alternatively, the first data preparing means may be adapted to prepare a set of basic output-image unit pattern data when it determines that the unit pattern data representing the pattern of the currently processed output image segment has not been stored in the pattern data memory. In this case, the first data preparing means may prepare a set of output data for each of the output image segments, as a set of basic output-image unit pattern data. The prepared unit pattern data are stored in first memory means, and the second data preparing means includes second memory means for storing the same data as prepared by the first data preparing means, and uses the data stored in the second memory means, to prepare the output data for the relevant output image segment.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 3 is a view showing an entire output image consisting of nine image segments, as superposed on an output coordinate system;

FIG. 4A is a view indicating an outline of a basic output image area as superposed on the output coordinate system;

FIG. 4B is a view indicating positions of image dots within the outline of the basic output image area of FIG. 4A;

FIGS. 7A-1 through 7A-4 are views indicating outlines of the basic output image area as superposed on the output coordinate system;

FIGS. 7B-1 through 7B-4 are views indicating positions of image dots within the outlines of FIGS. 7A-1 through 7A-4;

FIGS. 8A and 8B are a flow chart illustrating a dot data preparation routine used in the embodiment of FIG. 6;

FIG. 9 is a view showing positions of image dots to be actually formed to form the entire output image of FIG. 4, according to the dot data prepared by the routine of FIGS. 8A and 8B;

FIGS. 11A and 11B are views showing examples of an input image and an output image as superposed on respective input and output coordinate systems, illustrating a conventional manner of preparing output dot data from input image data.

DETAILED DESCRIPTION OF THE PREFERRED EMBODIMENTS

Figure 1:
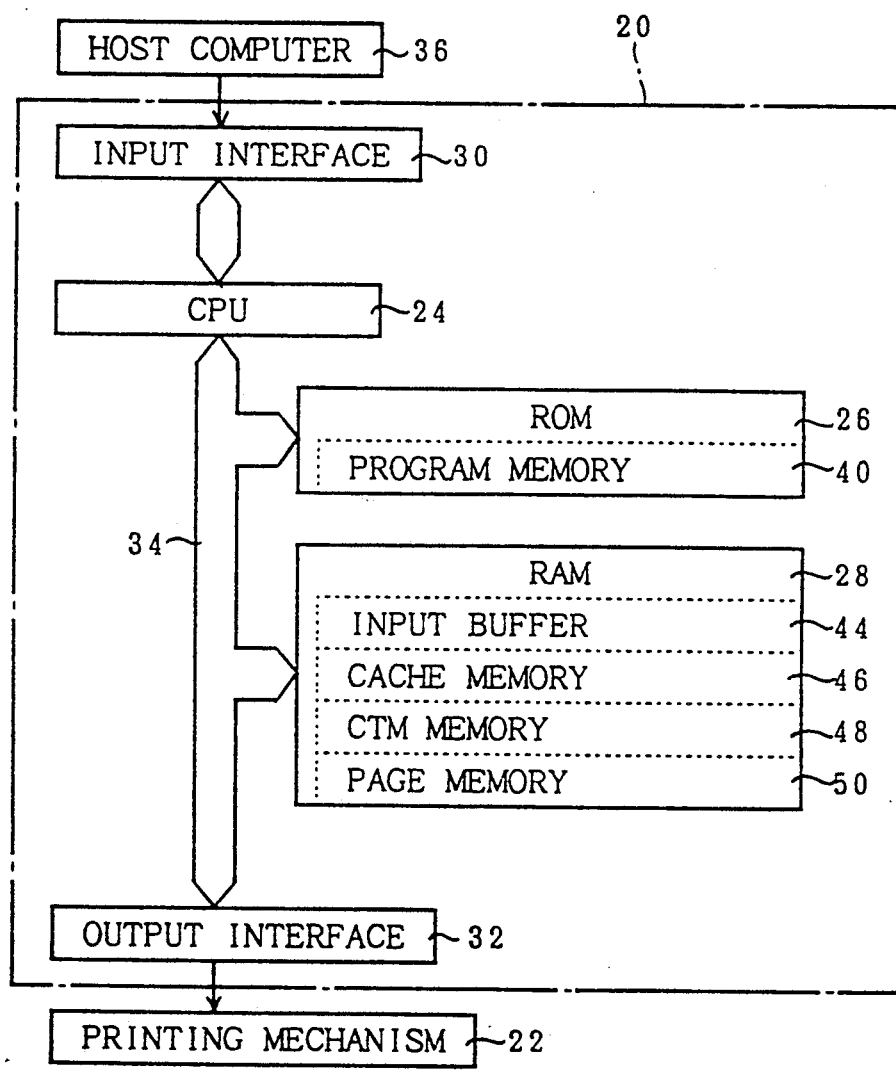
FIG. 1 is a schematic block diagram of a control system of a laser printer incorporating an apparatus constructed according to one embodiment of the present invention.

Referring first to FIG. 1, there is shown a laser printer 20, 22 including a main control device 20 and a laser printing mechanism 22 controlled by the main control device 20 to effect printing of images on an output medium in the form of a recording medium.

The main control device 20 whose major portion is constituted by a computer incorporates a central processing unit (CPU) 24, a read-only memory (ROM) 26, a random-access memory (RAM) 28, an input interface 30, an output interface 32, and a bus 32 for interconnecting these components of the control device. The main control device 20 is connected to a host computer 36 through the input interface 30, and to the laser printing mechanism 22 through the output interface 32.

The main control device 20 receives input image data from the host computer 36. The input image data are coordinate data representative of coordinate positions of picture elements in an input coordinate system (rectangular coordinate system), at which image dots are placed to define a desired input image. These picture elements represented by the input image coordinate data will be referred to as "input picture elements", where appropriate.

As is more clearly understood from the following detailed explanation, the main control device 20 is adapted to prepare printing data in the form of output dot data, from the received input image coordinate data, and apply drive signals to the laser printing mechanism 22 according to the prepared output dot data. The printing mechanism 22 has a laser printing head which operates according to the drive signals received from the main control device 20, to print the output image on the recording medium, as well known in the art. The output dot data are printing data representative of positions of picture elements in an output coordinate system (rectangular coordinate system), at which image dots are actually printed to collectively form or define an output image corresponding to the input image to print the output image. The picture elements represented by the output dot data will be referred to as "output picture elements" or "output image dots", where appropriate. In the present embodiment, the output dot data are bit data consisting of a multiplicity of bits which correspond to picture elements in the output coordinate system and which are either "1" indicative of the output image dots or "0" indicative of the absence of the image dots.

The host computer 36 provides the main control device 20 with data specifying the characteristics of the input coordinate, and data for effecting the affine transformation of the input coordinate data into corresponding output coordinate data, as well as the input image data representative of the input picture elements. With the main control device 20 receiving the input image data, input coordinate specifying data and input coordinate transformation data (coordinate transformation matrix) from the host computer 36, the main control device 20 calculates coordinate transformation matrix for converting or transforming the coordinates of the input image data into corresponding coordinates of the output coordinate system.

Figure 2:
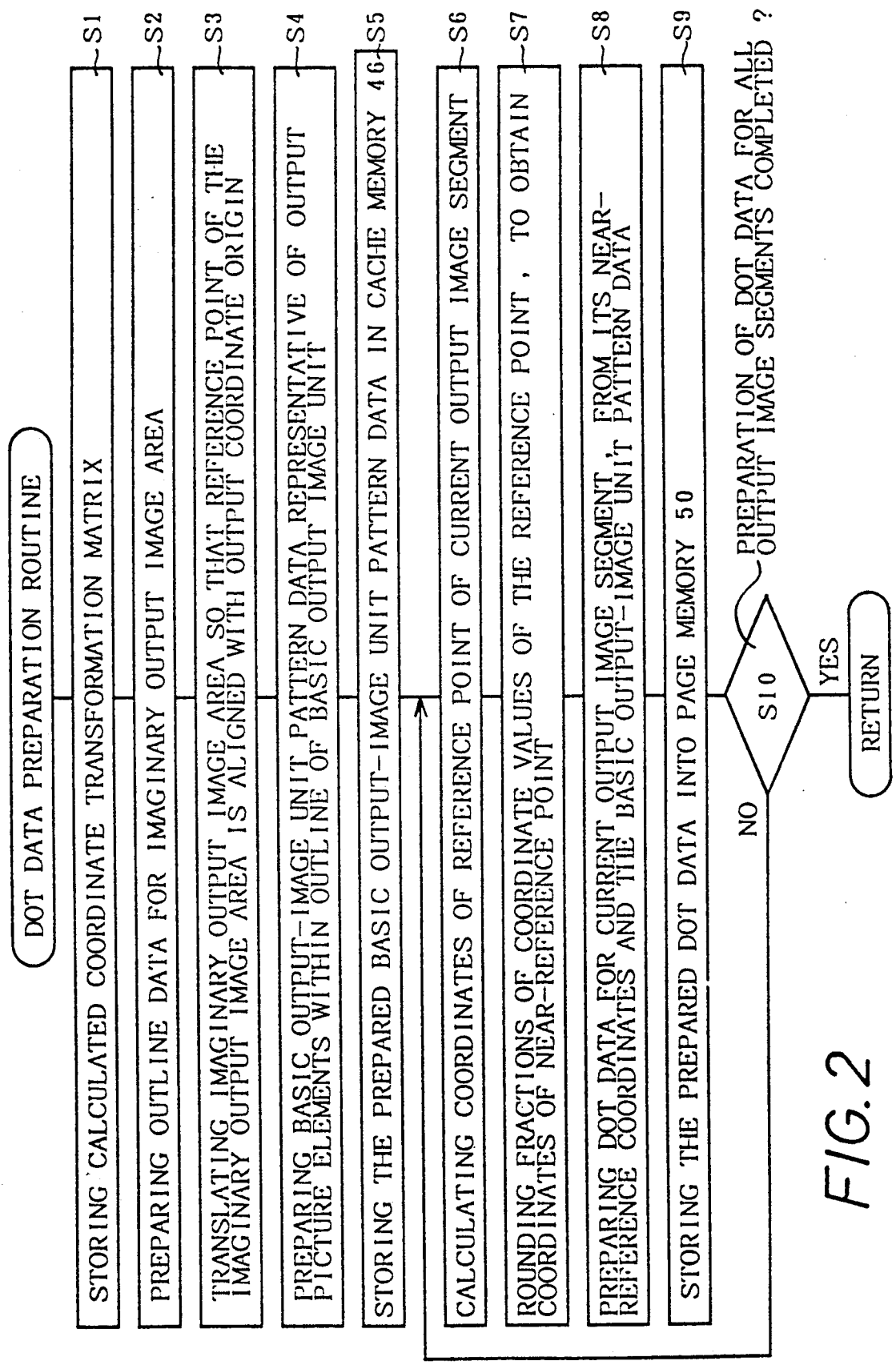
FIG. 2 is a flow chart illustrating a dot data preparation routine stored in a read-only memory of a computer of the control system.

The ROM 26 includes a PROGRAM memory 40 which stores various control programs such as a dot data preparation routine as illustrated in FIG. 2. As described below, the printing data in the form of output dot data are prepared from the input image data, by execution of the dot data preparation routine.

As indicated in FIG. 1, the RAM 28 includes an input buffer for storing a batch of data received from the host computer 36, a cache memory 46 (which will be described), a CTM (coordinate transformation matrix) memory 48 for storing coordinate transformation matrix data indicative of the calculated coordinate transformation matrix, and a PAGE memory 50 which will be described.

The PAGE memory 50 has a multiplicity of memory locations for storing data bits assigned to respective picture elements as positioned on the recording medium. Namely, the PAGE memory 50 is used to store a batch of output dot data for one page of text (output images). As indicated above, the bits of the output dot data are either "1" or "0". That is, "1" is stored at the memory locations corresponding to the picture elements at which image dots are formed, while "0" is stored at the memory locations corresponding to the picture elements at which no image dots are formed.

Like the PAGE memory 50, the cache memory 46 has memory locations corresponding to picture elements in the output coordinate system. The function of the cache memory 46 will become apparent from the following description of an operation of the present laser printer.

Upon application of power to the laser printer, the main control device 20 receives from the host computer 36 input image data representative of an input image and the other data indicated above, and stores the received data into the input buffer 44. When a printing start command is received, the dot data preparation routine of FIG. 2 is executed to prepare the output dot data corresponding to the received input image data.

In the present example, the input image represented by the input image data consists of nine input picture elements which are arranged adjacent to each other in three rows and three columns along the respective X and Y axes of the input coordinate system. As indicated below, the input picture elements correspond to positions at which printing of an image dot is required by the input image data. The outline of the input image in the input coordinate system is transformed into an output image (entire output image) in the output coordinate system (coordinate system of the main control device 20), by affine transformation of the input image along a diagonal line extending from the origin (0, 0) of the input coordinate system, as indicated in FIG. 3, based on the coordinate transformation matrix stored in the CTM memory 48. The entire output image consists of nine output image segments E00, E10, E20, E01, E11, E21, E02, E12 and E22 (translated output image areas) which correspond to the respective nine input picture elements defined by the input image data.

In the present embodiment, each output image segment, which has a rhombic outline, has a reference point (first reference point) which is a left lower apex or corner of the rhombic outline. As described below with respect to step S7 of the dot data preparation routine of FIG. 2, the X and Y coordinates of the reference point are rounded by discarding the decimal fractions of the coordinate values, irrespective of the values of the fractions. Thus, near-reference points (second reference points) located near the reference points of the output image segments are obtained such that the near-reference points are spaced apart from each other by distances equal to multiples of the size of the picture elements in the X and Y directions. The parallel straight lines parallel to the X axis of the output coordinate system of FIG. 3 are raster scanning lines along which the laser print head of the printing mechanism 22 effects scanning for printing. Each raster line is given Y-axis coordinate values (integer) which are represented by parallel straight lines parallel to the Y axis. These straight lines parallel to the X and Y axes cooperate with each other to define a lattice in which the intersections of the X and Y lines represent the centers (nominal positions) of the picture elements in the output coordinate system, at which image dots may or may not be formed according to printing data in the form of output dot data which are prepared as described below.

Referring to the flow chart of FIG. 2, the control flow first executes step S1 in which the main control device 20 calculates the coordinate transformation matrix for converting the coordinates of the input image data into coordinates in the output coordinate system, as indicated above, and stores the calculated transformation matrix data in the CTM memory 48 of the RAM 28. The control flow then goes to step S2 in which four coordinate points (0, 0), (1, 0), (1, 1) and (0, 1) in the input coordinate system are selected as the data for defining an imaginary input picture element. The outline of the imaginary input picture element is translated from and similar to that of each input picture element. Also in step S2, the coordinates of the four apexes of the imaginary input picture element in the input coordinate system are converted into coordinates of the output coordinate system, according to the coordinate transformation matrix stored in the memory 48. As a result, the four coordinate values defining an imaginary output image area (translated output image area) corresponding to the imaginary input picture element are calculated. In other words, these four coordinate values of the output coordinate system define an outline of the imaginary output image area, and constitute outline data representative of the four apexes of the imaginary output image area.

Step S2 is followed by step S3 in which the coordinates of the imaginary output image area are translated so that the reference point of the imaginary output image area is aligned with or located at the origin (0, 0) of the output coordinate system. The outline of the translated imaginary output image area, that is, a basic output image area is indicated in dashed line in FIG. 4A. Certainly, the coordinates of the basic output image area including those of the reference point are accordingly changed from the coordinates of the imaginary output image area. The control flow then goes to step S4 in which the coordinates of the the center of the output picture elements within the outline of the basic output image area, i.e., the coordinates of the intersections which lie within the outline are determined as the positions of image dots to be formed so as to define the basic output image area. In other words, these positions define a basic pattern of image dots, and the coordinates representing these positions are referred to as basic output-image unit pattern data.

White circles in FIG. 4A represent the five image dots of the basic output image area which are represented by the basic output-image unit pattern data. In the present embodiment, the basic output-image unit pattern data are used for determining the number and positions of the image dots to be actually printed to form the individual output image segments on the recording medium, as described below. As indicated in the table of FIG. 4B, the five image dots consist of one dot located at the X-axis coordinate value "0" on the raster line No. 1, two dots located at the X-axis coordinate values "1" and "2" on the raster line No. 2, and two dots located at the X-axis coordinate values "1" and "2" on the raster line No. 2.

Step S4 is followed by step S5 in which the prepared basic output-image unit pattern data representative of the basic output image area are stored in the cache memory 46, such that the bits "1" are stored at the memory locations cooresponding to the positions of the output picture elements at which the five image dots are formed. Thus, the basic output-image unit pattern data are stored in the cache memory 46 such that the reference point of the basic output image area represented by the stored pattern data is located at the origin (0, 0) of the output coordinate system. In other words, the five image dots represented by the output-image unit pattern data are positioned with respect to the origin of the coordinate system, that is, with respect to the reference point which has been moved to the origin. Therefore, the basic output-image unit pattern data stored in the cache memory 46 represent both the pattern of the five image dots as indicated in FIG. 4A and the position of the pattern in the output coordinate system.

Then, steps S6-S9 are executed for preparing output dot data for each of the nine output image segments E00-E22, initially for the first segment E00. In step S6, the coordinates of the reference point (lower left apex) of the relevant or current output image segment are calculated according to the input image data and the coordinate transformation matrix stored in the CTM memory 48. Step S6 is followed by step S7 in which the decimal fractions of the X and Y coordinates of the reference point (first reference point) of the current output image segment are discarded, whereby the coordinates of a near-reference point (second reference point) whose X and Y coordinate values are equal to or smaller than those of the first reference point and which is nearest to the first reference point are calculated.

The control flow then goes to step S8 in which printing data in the form of output dot data are prepared by changing the basic output-image unit pattern data stored in the cache memory 46, according to the calculated coordinates of the near-reference point of the relevant output image segment, so that the coordinates of the near-reference point of the basic output image area are equal to those of the near-reference point of the relevant output image segment. The thus prepared output dot data represent the positions of image dots which are actually formed to print the relevant output image segment. Step S8 is followed by step S9 to store the prepared output dot data into the PAGE memory 50.

Figure 5:
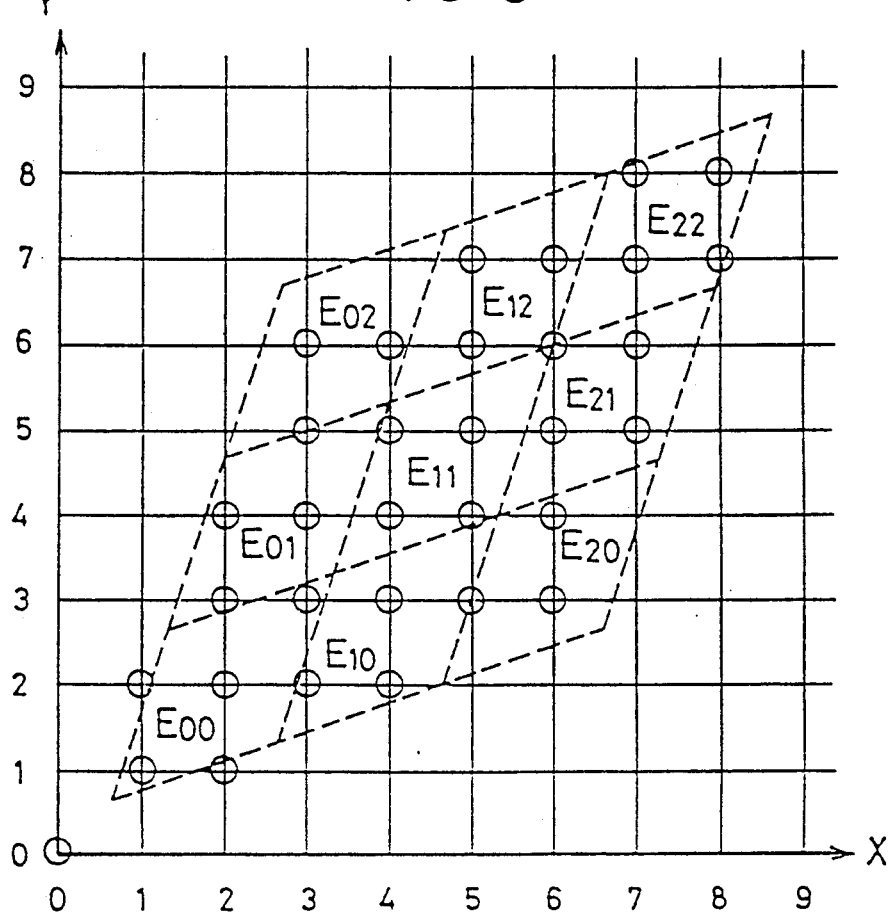
FIG. 5 is a view showing positions of image dots to be actually formed to print the entire output image.

The control flow then goes to step S10 to determine whether the output dot data have been prepared for all of the output image segments E00-E22. If there is any output image segment whose output dot data have not been prepared, the control flow returns to step S6, and steps S6-S9 are repeated to prepare the output dot data for the relevant output image segment. Steps S6 through S10 are repeatedly executed until an affirmative decision is obtained in step S10. The positions of image dots (output picture elements) represented by the thus prepared batch of output dot data for the nine output image segments (entire output image) are indicated by circles in FIG. 5.

After the dot data preparation routine of FIG. 2 is repeatedly executed to prepare a batch of output dot data for one page of text, the print head of the laser printing mechanism 22 is operated by drive signals generated according to the output dot data stored in the PAGE memory 50, whereby the one page of text is printed on the recording medium.

It will be understood from the above explanation of the present embodiment that the COORDINATE CONVERSION DETERMINANT memory 48 and the portions of the computer of the control device 20 assigned to execute steps S1 and S2 constitute means for calculating the coordinates of the reference point of the imaginary output image area corresponding to the basic input image unit, and also constitute means for preparing the outline data representative of the basic output image area. It will be further understood that the portion of the computer assigned to execute step S3 constitutes means for translating the coordinates of the imaginary output image area into those of the basic output image area so that the reference point is aligned with the origin of the output coordinate system, and that the portion of the computer assigned to execute step S4 constitutes means for preparing the basic output-image unit pattern data. Further, the portion of the computer assigned to execute step S5 constitutes pattern data memory means for storing the prepared basic output-image unit pattern data, and the portions of the computer assigned to execute steps S6-S10 constitute means for preparing the output dot data representative of image dots to be actually formed for printing.

In the above embodiment, the X and Y coordinates of the reference point (first reference point) of the imaginary output image area and each output image segment are rounded in step S7 to obtain the near-reference point (second reference point), by discarding the decimal fractions of the coordinate values. This manner of rounding causes a maximum coordinate conversion error substantially equal to the size of the picture elements or image dots, which is equivalent to the coordinate value of "1". However, the coordinate conversion error (distances between the reference point and near-reference point, i.e., deviation of the reference point from the nominal position as defined by the input image data) may be reduced. The following embodiment is adapted so that the maximum coordinate conversion error is substantially equal to the half of the size of the picture elements (substantially equal to the half dot size).

Figure 6:
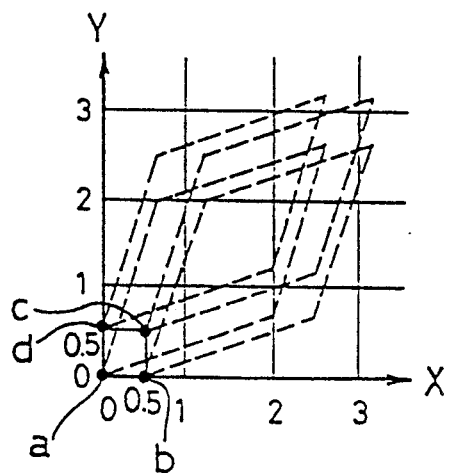
FIG. 6 is a view showing another embodiment of the invention, in which the basic output image area has four different positions in the output coordinate system.

In this second embodiment, the decimal fractions of the coordinate values of the reference point of the imaginary output image area and each output image segment are discarded if the fractions are smaller than 0.5, and are rounded to 0.5 if the fractions are equal to 0.5 or larger (no more than 1.0). According to this arrangement, four different near-reference points are available, as indicated at "a", "b", "c" and "d" in FIG. 6 when applied to the imaginary output image area (corresponding to the imaginary input picture element), for example. Namely, the imaginary output image area has one of the four near-reference points a(0, 0), b(0.5, 0), c(0.5, 0.5) and c(0, 0.5) in the output coordinate system, so as to define four positions of the basic output image area for determining four basic patterns of image dots. FIGS. 7A-1 through 7A-4, and FIGS. 7B-1 through 7B-4 indicate the positions of the image dots or output picture elements lying within the outlines of the basic output image area which is obtained by moving the reference point of the imaginary output image area to the near-reference points "a", "b", "c" and "d". FIGS. 7A-1, 7A-2, 7A-3 and 7A-4 correspond to the near-reference points "a", "b", "c" and "d", respectively, while FIGS. 7B-1, 7B-2, 7B-3 and 7B-4 correspond to the near-reference points "a", "b", "c" and "d", respectively. Before the output dot data are prepared for each output image segment, four sets of basic output-image unit pattern data for each of the four near-reference points "a" through "d" are prepared and stored in the cache memory 46. When the output dot data for each output image segment are prepared, one of the four near-reference points "a" through "d" of the basic output image area is selected based on the coordinates of the near-reference point of the relevant output image segment. In preparing the output dot data for the output image segment, the basic output-image unit pattern data corresponding to the selected near-reference point of the basic output image area are retrieved from the cache memory 46, and the output dot data are prepared based on the retrieved basic output-image unit pattern data and the coordinates of the near-reference point of the relevant output image segment.

Figure 8A:
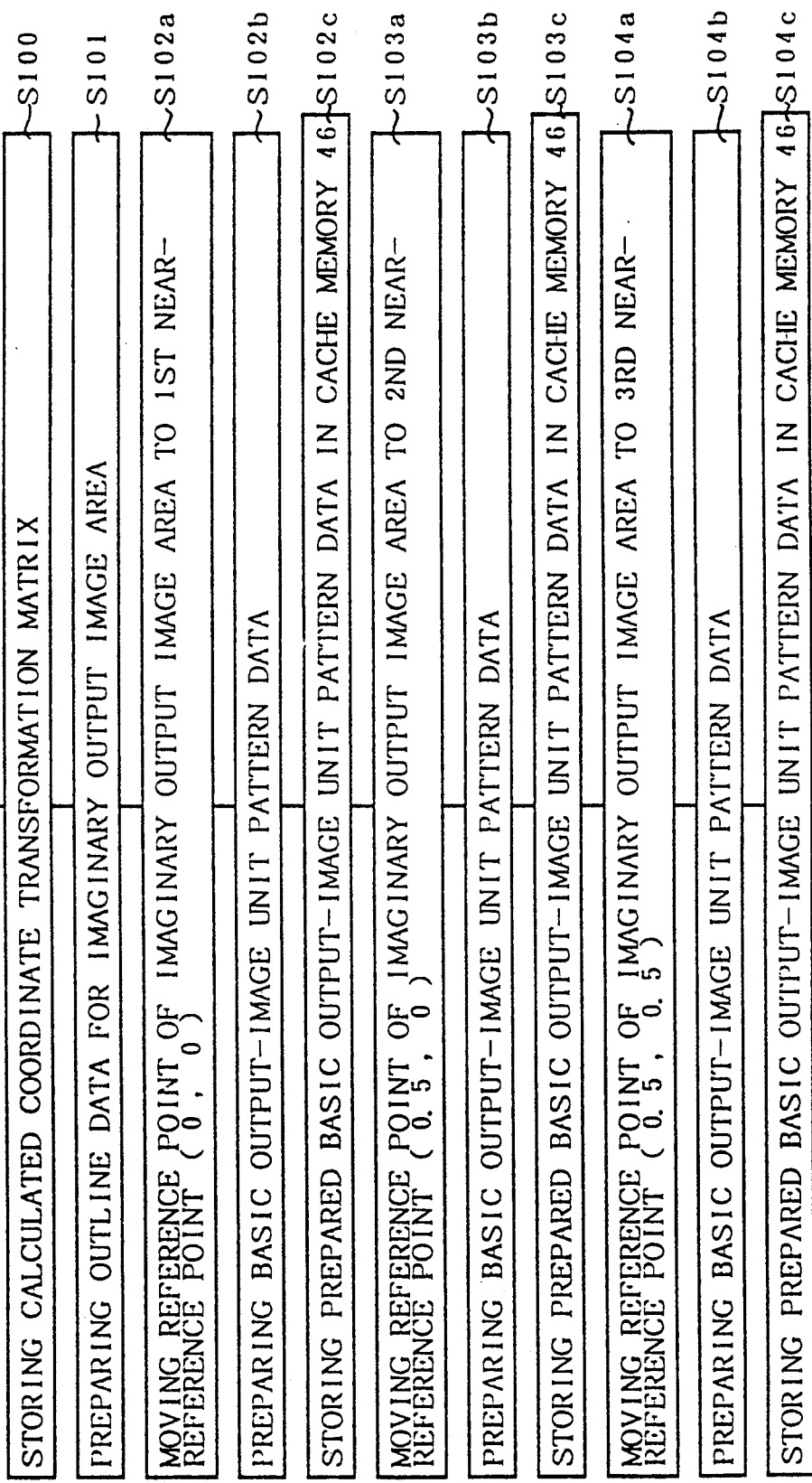

In the present second embodiment of the invention, the PROGRAM memory 40 of the main control device 20 stores a dot data preparation routine as illustrated in FIGS. 8A and 8B, in place of the routine as illustrated in FIG. 2. An operation of the main control device 20 will be described by reference to the flow chart of FIGS. 8A and 8B.

The control flow first executes step S100 to store the calculated coordinate transformation matrix data in the memory 48, as in step S1 of FIG. 2. In the next step S101, the coordinates of the four apexes of the basic output image area are calculated according to the coordinate transformation matrix, to prepare the outline data of the imaginary output image area.

The control flow then goes to step S102a in which the coordinates of the imaginary output image area are translated such that the reference point (first reference point) is aligned with the first near-reference point a(0, 0), to obtain a first basic output image area. Step S102a is followed by step S102b to prepare the basic output-image unit pattern data representative of the output picture elements or image dots within the outline of the first basic output image area. In the following step S102c, the prepared basic output-image unit pattern data are stored in the cache memory 46, in relation to the position of the first near-reference point (first second reference point) a(0,0).

In steps S103a through S105c, the coordinates of the basic output image area are converted or translated such that the reference point is aligned with or located at the second, third and fourth near-reference points b(0.5, 0), c(0.5, 0.5) and d(0, 0.5), and the basic output-image unit pattern data are prepared and stored in the cache memory 46, in relation to the positions of these second, third and fourth near-reference points b, c and d. That is, steps S103a, S104a, S105a correspond to step S102a, steps S103b, S104b, S105b correspond to step S102b, and steps S103c, S104c, S105c correspond to step S102c.

Step S105c is followed by step S106 in which the coordinates of the reference point of the current output image segment are calculated according to the data stored in the CTM memory 48. The control flow then goes to step S107 in which the coordinates of the near-reference point of the relevant output image segment are calculated, by discarding the decimal fractions of the coordinates of the reference point if the fractions are smaller than 0.5, and rounding the fractions to 0.5 if the fractions are equal to 0.5 or larger. Step S107 is followed by step S108 to determine one of the four near-reference points "a", "b", "c" and "d" of the basic output image area, which one near-reference point corresponds to the calculated near-reference point of the relevant output image segment. This determination is made based on the decimal fractions of the coordinates of the near-reference point of the relevant output image segment. More specifically, if the decimal fractions of both of the X and Y coordinates of the near-reference point of the output image segment are "0", the first near-reference point "a" is selected. If the decimal fraction of the X coordinate is "0.5" while that of the Y coordinate is "0", the second near-reference point "b" is selected. If the decimal fractions of both of the X and Y coordinates are "0.5", the third near-reference point "c" is selected. If the decimal fraction of the X coordinate is "0" while that of the Y coordinate is "0.5", the fourth near-reference point is selected. Depending upon the selected near-reference point of the basic output image area, the corresponding set of basic output-image unit pattern data is retrieved from the cache memory 46. The output dot data for the relevant output image segment are prepared by changing the retrieved basic output-image unit pattern data according to the coordinates of the near-reference point of the relevant output image segment, so that the coordinates of the near-reference points (second reference points) of the basic output image area and relevant output image.

In step S109, the prepared output dot data are stored in the PAGE memory 50. Step S109 is followed by step S110 to determine if the output dot data have been prepared for all of the output image segments, i.e., for the entire output image. If an affirmative decision (YES) is obtained in step S110, the dot data preparation routine of FIGS. 8A and 8B is terminated. If a negative decision (NO) is obtained in step S110, the control flow returns to step S106, to prepare the output dot data for the next output image segment. Steps S106-S110 are repeatedly executed until the affirmative decision is obtained in step S110. Circles in FIG. 9 indicate the positions of the output picture elements or image dots defined by the prepared batch of output dot data.

It will be understood from the above explanation of the present embodiment that the CTM memory 48 and the portions of the computer of the control device 20 assigned to execute steps S101 and S102 constitute means for calculating the coordinates of the reference point of the imaginary output image area corresponding to the imaginary input picture element, and also constitute means for preparing the outline data representative of the imaginary output image area. It will be further understood that the portions of the computer assigned to execute steps S102a, S103a, S104a and S105a constitute means for converting the coordinates of the imaginary output image area so that the reference point is aligned with or located at each of the four near-reference points "a", "b", "c" and "d" of the basic output image unit, to obtain respective basic output image areas, and that the portions of the computer assigned to execute steps S102b, S103b, S104b and S105b constitute means for preparing the basic output-image unit pattern data. Further, the portions of the computer assigned to execute steps S102c, S103c, S104c and S105c constitute pattern data memory means for storing the prepared basic output-image unit pattern data, and the portions of the computer assigned to execute steps S106-S110 constitute means for preparing the output dot data representative of image dots to be actually formed for printing.

In the second embodiment described above, four sets of basic output-image unit pattern data representative of the four basic patterns of output image dots having the respective four near-reference points "a" through "d" are prepared and stored in the cache memory 46, irrespective of whether all of these four sets of basic output-image unit pattern data are actually used for preparing the output dot data for the output image. In this case, therefore, there is a possibility that one or more of these four sets of basic output-image unit pattern data is/are not actually used for preparing the output dot data. To reduce the data processing time due to this possibility, the dot data preparation routine of FIG. 8 may be modified as indicated in the flow chart of FIG. 10.

Figure 10:
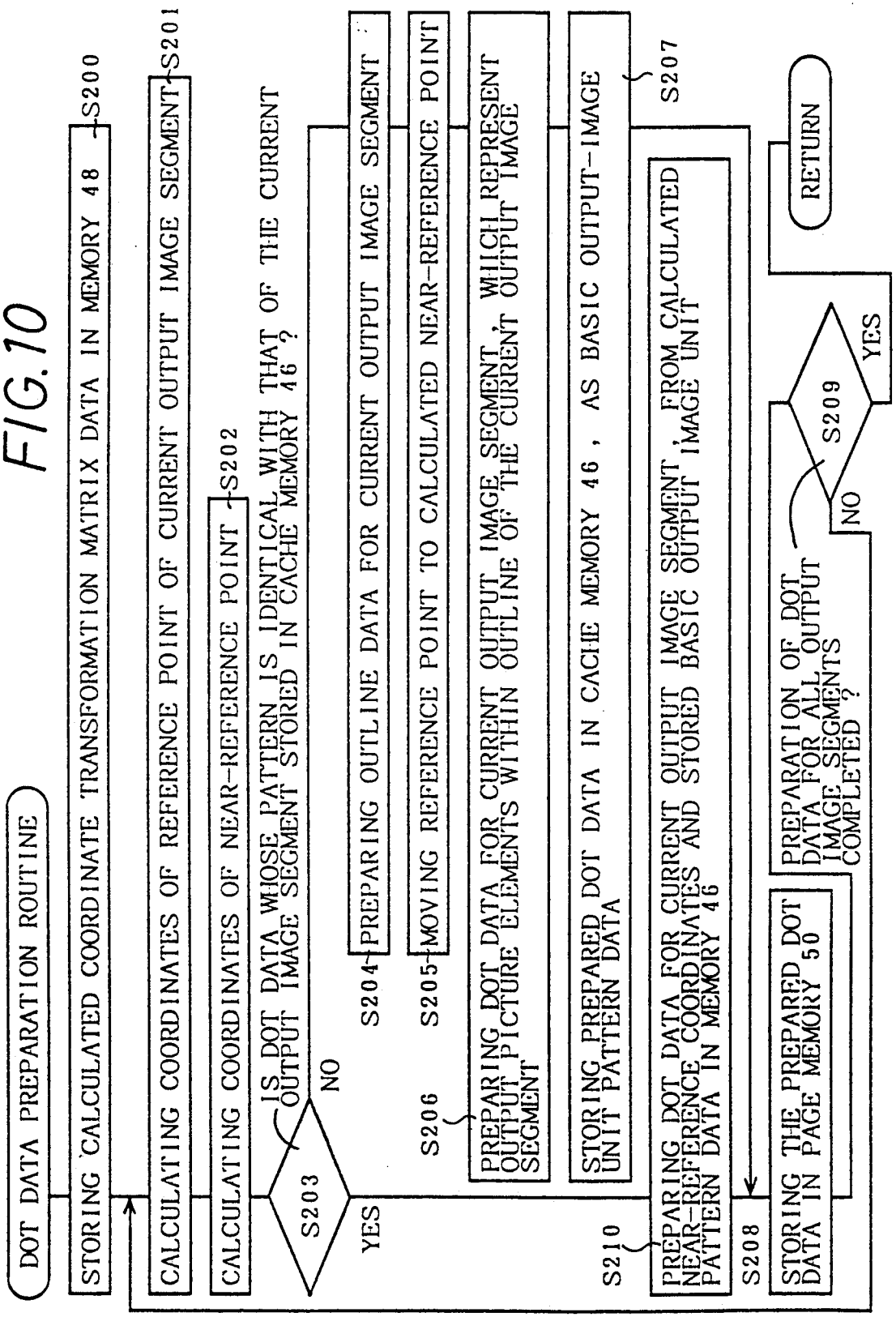
FIG. 10 is a flow chart illustrating a dot data preparation routine used in a further embodiment of the present invention.

The modified dot data preparation routine of FIG. 10 will be described.

In step S200, the coordinate transformation matrix is calculated and stored in the CTM memory 48, as in step S100. Step S200 is followed by step S201 in which the coordinates of the reference point (first reference point) of the current output image segment are calculated as in step S106. The control flow then goes to step S202 in which the coordinates of the near-reference point (second reference point) of the current output image segment are calculated, as in step S107. Step S202 is followed by step S203 to determine whether the cache memory 46 has already stored the output dot data whose image dot pattern is identical with that of the current output image segment. This determination can be effected by determining whether the decimal fractions of the X and Y coordinates of the near-reference point of the current output image segment are equal to those of the output image segment represented by any output dot data stored in the cache memory 46.

If a negative decision (NO) is obtained in step S203, the control flow goes to step S204 in which the outline data of the current output image segment are prepared, in a manner similar to the manner of preparing the outline data of the imaginary output image area in step S101. In the next step S205, the coordinates of the current output image segment are translated or converted such that the reference point is aligned with the near-reference point determined in step S201. Step S205 is followed by step S206 to prepare the output dot data representative of the output picture elements or image dots which lie in the outline of the translated output image segment. In the following step S207, the prepared output dot data are stored in the cache memory 46 (first memory) as a set of basic output-image unit pattern data. Step S207 is followed by step S208 in which the prepared output dot data of the current output image segment are also stored in the PAGE memory 50 (second memory).

The control flow then goes to step S209 to determine whether the output dot data have been prepared for all of the output image segments, that is, for the entire output image. If an affirmative decision (YES) is obtained in step S209, the dot data preparation routine is terminated. If a negative decision (NO) is obtained, the control flow returns to step S201.

If an affirmative decision (YES) is obtained in step S203, that is, if the output dot data whose image dot pattern is identical with that of the current output image segment is already stored in the cache memory 46, the control flow goes to step S210, skipping steps S204-S207. In step S210, the output dot data for the current output image segment are prepared based on the appropriate output dot data which are already stored in the cache memory 46 as the basic output-image unit pattern data, and based on the coordinates of the near-reference point of the relevant output image segment. Step S210 is followed by step S208 and S209.

It will be understood that the memory 48 and the portions of the computer of the control device 20 assigned to execute steps S200-S204 constitute means for preparing the outline data of the output image segment (equivalent to the imaginary output image area) before the reference point is moved to the near-reference point, and the portion of the computer assigned to execute step S201 constitutes means for determining or calculating the coordinates of the reference point of the output image segment, while the portion assigned to execute step S202 constitutes means for calculating the coordinates of the near-reference point of the output image segment. Further, the portions of the computer assigned to execute steps S205, S206, S208 and S209 constitute means for preparing the basic output-image unit pattern data. The cache memory 46 and the portion of the computer assigned to execute step S207 constitute pattern data memory means for storing the prepared basic output-image unit pattern data, while the portions of the computer assigned to execute steps S201–S210 constitute means for preparing the output dot data for the output image segment. It is noted that step S206 is used for preparing the basic output-image unit pattern data as well as the output dot data for the output image segments.

While the present invention has been described in the present preferred embodiments with a certain degree of particularity by reference to the accompanying drawings, it is to be understood that the present invention is not limited to the details of the illustrated embodiments, but the invention may be embodied with various changes, modifications and improvements.

In the illustrated embodiments, the basic output-image unit pattern data representative of the basic output image area are stored in the cache memory 46, such that the bits of the dot data corresponding to the picture elements in the output coordinate system are stored in the corresponding memory locations assigned to the individual picture elements. However, the basic output-image unit pattern data may take other forms. For example, the basic output-image unit pattern data may be coordinate data representative of the X and Y coordinates of the output picture elements at which image dots are actually formed, or may take the form as indicated in FIGS. 4B and 7B, in which the positions of the image dots are represented by the raster line numbers, and the coordinates of the start and end positions of the successive image dots to be formed on each raster line.

Other changes, modifications and improvement of the illustrated embodiments may occur to those skilled in the art, without departing from the spirit and scope of the invention defined in the following claims.

What is claimed is:

1. An apparatus for preparing output data representative of positions of a plurality of output picture elements which collectively define a plurality of output image segments corresponding to respective input picture elements of a received input image, said output image segments being reproduced on an output medium according to said output data, said apparatus comprising:

first data preparing means for determining a basic output image area for each of at least one group of output image segments, and preparing at least one set of basic output-image unit pattern data corresponding to said at least one group of output image segments, respectively, each of said at least one set of basic output-image unit pattern data being representative of a pattern of positions of output picture elements of said basic output image area, said each group of output image segments consisting of the output image segments which have the same pattern of positions of the output picture elements as said pattern represented by the corresponding set of basic output-image unit pattern data;

pattern data memory means for storing said at least one set of basic output-image unit pattern data such that any one of said at least one set of basic output-image unit pattern data is readable from said pattern data memory means; and second data preparing means operable such that if the pattern of any one of said output image segments corresponding to said input picture elements is identical with the pattern of said basic output image area represented by any one of said at least one set of basic output-image unit pattern data stored in said pattern data memory means, said second data preparing means prepares a set of output data representative of positions of the output picture elements of said any one output image segment, according to the corresponding set of basic output-image unit pattern data, without determining positions of the individual output picture elements of said any one output image segment.

2. An apparatus according to claim 1, wherein said first data preparing means comprises:

means for determining coordinates of a first reference point of one of translated output image areas which correspond to respective translated input image areas which are obtained by translating any one of said input picture elements;

means for rounding the determined coordinates of said first reference point of said one translated output image area, and thereby determining coordinates of a second reference point of said one translated output image area; and outline data preparing means for preparing outline data representative of an outline of said one translated output image area, and wherein said first data preparing means preparing each of said at least one set of basic output-image unit pattern data of said basic output image area such that said each set of basic output-image unit pattern data represent positions of output picture elements lying within the outline of said one translated output image area which has been translated on said output medium so that said first reference point of said one translated output image area is located at a point which satisfies a predetermined condition, said second data preparing means being operable such that if the pattern of any one of said output image segments is identical with the pattern of the basic output image area represented by any one of said at least one set of basic output-image unit pattern data stored in said pattern data memory mans, said second data preparing means determining a second reference point of said any one output image segment similar to said second reference point of said one translated output image area, and preparing said set of output data representative of said any one output image segment, without an operation of said outline data preparing means, by changing said corresponding set of basic output-image unit pattern data such that said second reference points of said any one output image segment and said basic output image area are aligned with each other.

3. An apparatus according to claim 2, wherein said one translated output image area corresponds to one of said translated input image areas which consists of one of said input picture elements.

4. An apparatus according to claim 2, wherein said one translated output image area corresponds to one of said translated input image areas which is obtained by translating any one of said input picture elements to a position outside said input image.

5. An apparatus according to claim 2, wherein said one translated output image area consists one of said output image segments corresponding to one of said input picture elements.

6. An apparatus according to claim 2, wherein said one translated output image area consists of a translated output image area which is obtained by translating one of said output image segments corresponding to said any one of said input picture elements, to a position outside said output image segments.

7. An apparatus according to claim 2, wherein said one translated output image area consists of a rectangular area, and said means for determining coordinates of a first reference point determines one of four apexes of said rectangular area as said first reference point of said one translated output image area.

8. An apparatus according to claim 2, wherein said at least one group of output image segments consists of one group of output image segments and said at least one set of basic output-image unit pattern data consists of one set of basic output-image unit pattern data, said means for rounding the determined coordinates of said first reference point rounding said determined coordinates of said first reference point of said translated output image areas to obtain said second reference point so that all of said output image segments have the same pattern of positions of output picture elements.

9. An apparatus according to claim 2, wherein said at least one group of output image segments consists of four groups of output image segments and said at least one set of basic output-image unit pattern data consists of four sets of basic output-image unit pattern data, said means for rounding the determined coordinates of said first reference point rounds said determined coordinates of said first reference point of said translated output image areas to obtain said second reference point so that said four groups of output image segments have respective four different patterns of positions of output picture elements.

10. An apparatus according to claim 2, wherein said first data preparing means prepares each of said at least one set of basic output-image unit pattern data such that said each set of basic output-image unit pattern data represents positions of output picture elements which lie within said outline of said one translated output image area when said one translated output image area is translated such that said first and second reference points are identical with each other.

11. An apparatus according to claim 2, wherein said first data preparing means prepares each of said at least one set of basic output-image unit pattern data such that said each set of basic output-image unit pattern data represents positions of output picture elements which lie within said outline of said one translated output image area when said one translated output image area is moved such that said first reference point is aligned with a point which is substantially a center of an area in which said second reference point obtained by rounding the coordinates of said first reference point may be located.

12. An apparatus according to claim 2, wherein said first data preparing means prepares all of said at least one set of basic output-image unit pattern data and said pattern data memory means stores said all of said at least one set of basic output-image unit pattern data, in relation to the coordinates of said second reference point of said basic output image area, before said second data preparing means operates to prepare said output data, and wherein said second data preparing means retrieves one of said at least one set of basic output-image unit pattern data which represent the same pattern of positions of output picture elements as the pattern of each output image segment corresponding to each of said input picture elements, and prepares the set of output data for said each output image segment, according to the retrieved set of basic output-image unit pattern data and said coordinates of said second reference point.

13. An apparatus according to claim 12, wherein said pattern data memory means stores each of said at least one set of basic output-image unit pattern data, in the form of a set of dot data which represent the positions of output picture elements lying within the outline of said basic output image area so as to satisfy a predetermined condition, said dot data consisting of bits each representative of the presence or absence of an image dot to be reproduced to form said output picture elements of said output image segment, said memory means having memory locations assigned to said bits, respectively.

14. An apparatus according to claim 12, wherein said pattern data memory means stores each of said at least one set of basic output-image unit pattern data, in the form of a set of coordinate data which represent the positions of output picture elements lying within the outline of said basic output image area so as to satisfy a predetermined condition.

15. An apparatus according to claim 1, wherein said first data preparing means prepares a set of output data for each of said output image segments corresponding to said input picture elements, as said at least one set of basic output-image unit pattern data, said pattern data memory means consisting of first memory means for storing said set of output data prepared by said first data preparing means, as said at least one set of basic output-image unit pattern data, said second data preparing means preparing means set of output data for each of said output image segments, according to said set of output data stored in said first memory means, said second data preparing means including second memory means for storing the set of output data prepared thereby, said first and second data preparing means operating sequentially for said plurality of output image segments, such that said first data preparing means prepares a set of output data for each one of said output image segments whose pattern of positions of output picture elements is not identical with the pattern represented by any set of basic output-image unit pattern data stored in said first memory means, and said first memory means stores as a set of basic output-image unit pattern data the set of output data prepared by said first data preparing means, while said second memory means stores the prepared set of output data, said second data preparing means being operable such that if the pattern of positions of output picture elements of said each one output image segment is identical with the pattern represented by any one set of basic output-image unit pattern data stored in said first memory means, said data preparing means operates to prepare a set of output data for said relevant output image segment, according to the corresponding set of basic output-image unit pattern data, and said second memory means stores the set of output data prepared by said second data preparing means.

16. An apparatus according to claim 15, wherein said first memory means stores each of said at least one set of basic output-image unit pattern data, in the form of a set of dot data which represent the positions of output picture elements lying within the outline of the corresponding output image segment so as to satisfy a predetermined condition, said dot data consisting of bits each representative of the presence or absence of an image dot to be reproduced to form said output picture elements of said output image segment, said first memory means having memory locations assigned to said bits, respectively.

17. An apparatus according to claim 15, wherein said first memory means stores each of said at least one set of basic output-image unit pattern data, in the form of a set of coordinate data which represent the positions of output picture elements lying within the outline of the corresponding output image segment so as to satisfy a predetermined condition.

* * * * *